(12) United States Patent
Chaiken et al.

(10) Patent No.: US 7,426,719 B2
(45) Date of Patent: Sep. 16, 2008

(54) METHOD AND SYSTEM FOR REWRITING UNWIND DATA IN THE PRESENCE OF EXCEPTIONS

(75) Inventors: Ronnie Ira Chaiken, Woodinville, WA (US); David Mitford Gillies, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 09/997,056

(22) Filed: Nov. 29, 2001

(65) Prior Publication Data

US 2003/0101380 A1 May 29, 2003

(51) Int. Cl.
*G06F 9/44* (2006.01)
(52) U.S. Cl. .............. 717/128; 717/116; 717/118; 717/151; 714/2; 714/25
(58) Field of Classification Search .......... 714/34–39, 714/45, 2, 25; 717/168–178, 116, 118, 128, 717/151
See application file for complete search history.

(56) References Cited

U.S. PATENT DOCUMENTS

| | | | | |
|---|---|---|---|---|
| 4,866,599 | A * | 9/1989 | Morganti et al. .......... | 726/17 |
| 5,127,103 | A * | 6/1992 | Hill et al. .................. | 714/45 |
| 5,802,371 | A * | 9/1998 | Meier ........................ | 717/133 |
| 6,014,515 | A * | 1/2000 | Burch ........................ | 717/129 |
| 6,182,243 | B1 * | 1/2001 | Berthe et al. .............. | 714/38 |
| 6,293,712 | B1 * | 9/2001 | Coutant ..................... | 717/155 |
| 6,618,824 | B1 * | 9/2003 | Hastings ................... | 714/35 |
| 6,760,903 | B1 * | 7/2004 | Morshed et al. ........... | 717/130 |
| 7,007,198 | B2 * | 2/2006 | Boling ...................... | 714/15 |
| 2002/0188931 | A1 * | 12/2002 | Ewart et al. ............... | 717/154 |
| 2003/0023905 | A1 * | 1/2003 | Boling ...................... | 714/34 |

OTHER PUBLICATIONS

A Crash Course on the Depths of Win32 Structured Exception Handling, Microsoft System Journal, Matt Pietrak, Jan. 1997.
Vulcan: Binary Transformation in a Distributed Environment, Microsoft Research, Amitabh Srivastava, Andrew Edwards and Hoi Vo, MSR-TR-2001-50, Apr. 20, 2001, pp. 1-12.
IA64 Software Conventions and Runtime Architecture, Document No. 245358-002, Sep. 2000, pp. 11-1 to 11-18. See http://developer.intel.com.

* cited by examiner

*Primary Examiner*—Tuan Q. Dam
*Assistant Examiner*—Thuy Dao
(74) *Attorney, Agent, or Firm*—Merchant & Gould; Ryan T. Grace

(57) ABSTRACT

Described is a system and method of regenerating stack unwind data in the presence of exceptions. The system is directed to generating metadata for use during stack unwinding. The system includes procedures, a first plurality of metadata, and an unwind rewriter. Each metadata is associated with a corresponding procedure in the procedures. The unwind rewriter generates new metadata from the first plurality of metadata in response to a modification of the sequence of binary instructions within a procedure, such that the new metadata accurately represents the modified sequence of binary instructions. The method regenerates metadata in response to a binary modification to a procedure by receiving a first group of metadata associated with the unmodified procedure, parsing the first group of metadata, and generating a second group of metadata that accurately represents the binary modification to the procedure.

12 Claims, 15 Drawing Sheets

METHOD AND SYSTEM FOR REWRITING UNWIND DATA IN THE PRESENCE OF EXCEPTIONS

BACKGROUND OF THE INVENTION

The present invention relates generally to computer-executable software and more particularly to optimizations that may be applied to compiled software.

BACKGROUND OF THE INVENTION

A typical computer program may be composed of smaller programs known as procedures or subroutines. When a computer program is executed, a contiguous range of program address space is typically allocated for the call stack. The call stack consists of a set of stack frames, one for each procedure invocation, where each stack frame includes information about the parameters, local and temporary variables, and enough program state to resume execution when a procedure returns.

During runtime, a typical stack frame is created and pushed onto the call stack when a procedure is called, and then popped or removed from the call stack when the associated procedure exits. The call stack therefore, represents a structure of dynamically nested procedures that are active within the execution of the program at any given time.

When an improper event or error arises during execution of a program, an exception may be signaled from within the executing procedure. Exception handling often requires the ability to remove or "unwind" a number of frames from the call stack in order to transfer control to an exception handling procedure that may have been further down on the stack.

Stack unwinding in the presence of an exception involves the process of removing the stack frames from the call stack one at a time until a stack frame is encountered that represents a procedure that is willing to handle the exception. Unwinding typically starts with an initial context record, which describes the most recent activation of a procedure. Upon removing a stack frame from the call stack the exception runtime code reconstructs the runtime context for the previous procedure frames. If the procedure is willing to handle the exception, the unwinding stops and control is transferred to an exception handler for the procedure.

As the stack is unwound, it is necessary to recover the values of preserved registers that were saved by each procedure in order to reconstruct the previous frame's context. When a procedure's frame is removed from the call stack the preserved registers for its corresponding procedure must be reloaded with its saved values of local variables. The information about which preserved register is saved for a given procedure and where it is saved (e.g., memory or another register) is generated by the compiler as unwind data, stored in the binary text segment of the program itself, according to a particular programming convention. Unwind data, sometimes known as metadata, is a description of information related to a contiguous sequence of instructions of the program.

However, after source code for a computer program has been compiled, tools may be employed to insert code for profiling, or to reorder and optimize basic blocks of the code, or to otherwise instrument the code in a manner, that perturbs the binary code. When the binary code has been perturbed, the unwind data may no longer reflect the correct information necessary for the proper execution of the program during exceptions. The traditional approach for "fixing" the unwind data is to perform the modifications at the source code level, recompile and relink the computer programs. However, such an approach is a potentially expensive and lengthy process. Moreover, returning to the source code may not provide the flexibility required.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed towards providing a method and system for regenerating stack unwind data for a compiled binary executable.

Briefly stated, described is a system and method for parsing original metadata that represents an unmodified procedure and storing in a procedure side table information about relationships between the original metadata and instructions in the unmodified procedure. The procedure side tables are employed to generate new metadata in response to a modification of the binary procedure such that proper execution is ensured during runtime exceptions.

In accordance with one aspect of the present invention, a system is directed to generating metadata for use during stack unwinding. The system includes a plurality of procedures, a first plurality of blocks of metadata, and an unwind rewriter. Each procedure comprises a sequence of binary instructions. Each block of metadata is associated with a corresponding procedure in the plurality of procedures. The unwind rewriter is programmed to generate a second plurality of blocks of metadata from the first plurality of blocks of metadata in response to a modification of the sequence of binary instructions within a procedure, such that the second plurality of blocks of metadata accurately represents the same runtime semantics as that of the unmodified sequence of binary instructions.

In another aspect of the present invention, a computer-implemented method is directed to regenerating unwind data in response to a binary modification to a procedure. The procedure includes a plurality of basic blocks. The method includes receiving a first group of unwind data comprising an unwind table and a plurality of unwind descriptor records wherein the first group of unwind data is associated with the unmodified procedure, parsing the first group of unwind data to identify a start basic block and an end basic block for a region associated with the procedure, and generating a second group of unwind data comprising a second unwind table and a second plurality of unwind descriptor records such that the second group of unwind data accurately represents the binary modification to the procedure.

In yet another aspect of the present invention, a computer-readable medium encoded with a data structure for providing metadata representing a binary program including basic blocks that have been modified from a first order to a second order. The data structure includes a first metadata field associated with a first group of instructions within a first procedure and a second metadata field associated with a second group of instructions within the first procedure. The first metadata field and the second metadata field accurately reflect a flow of instructions of the basic blocks in the second order.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention now will be described more fully hereinafter "with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," means a direct connection between the things that are connected, or an indirect connection through one or more either passive or active intermediary devices or components. The meaning of "a," "an," and "the" include plural references. The meaning of "in" includes "in" and "on."

Briefly stated, the present invention provides a method and system for regenerating stack unwind data for a perturbed binary executable. In one method, unwind data is parsed and relationships between the unwind data and the instructions are employed to regenerate the unwind data.

Prior to describing the invention in greater detail, a list of some terms and their definitions is provided below.

Definition of Terms

Figure 6:
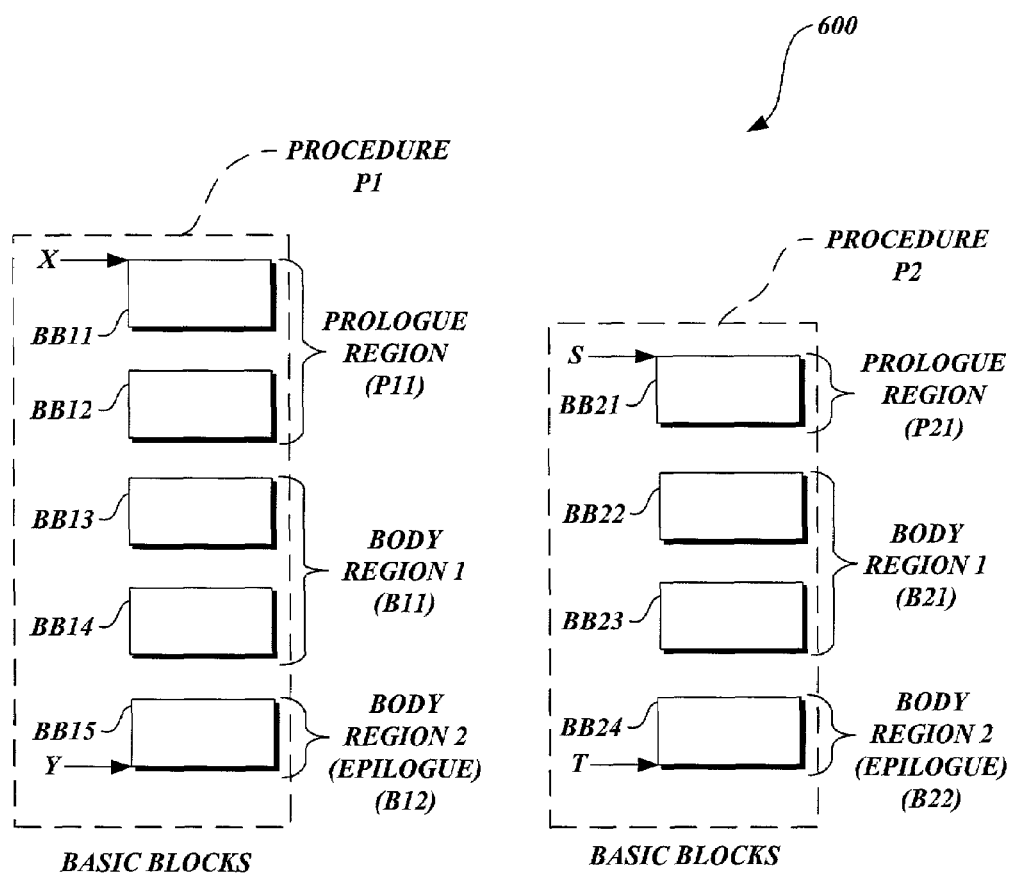
FIG. 6 is an illustrative example of two procedures decomposed into basic blocks.

Basic Block—A sequence of instructions having one entry point and one exit point wherein if the first instruction in the sequence is executed, the other instructions in that sequence will also be executed. For example, FIG. 6 shows basic blocks BB11-BB15 for procedure P1 and basic blocks BB21-BB24 for procedure P2. Note, however, that a program executing the first instruction of a basic block may not always execute the intervening instructions between the first instruction in the basic block and the last instruction in the basic block. This may occur, for example, if an exception (i.e. divide by 0) occurs that causes the program to execute other code or if a multitasking processor gives a time slice to another thread or process. However, once a basic block is entered, all the instructions in the basic block will be executed provided that the program operates normally and enough time to complete the instructions is provided.

Procedure Structures—A procedure included within a computer program may be logically viewed as comprising one or more regions. Specifically, a procedure may be divided into one or more "prologue" or "body" regions. The prologue region is a region of code where the stack frames and registers are established for the procedure. The instructions in the prologue region typically allocate a stack frame and save the preserved registers to restore the previous context. To unwind properly when an Instruction Pointer (IP) points to a location in a prologue region, a runtime requires a detailed description of the order of operation in this region, so that it knows what state has changed and which registers have been saved at any given point in that region. The body region does not vary the state of the stack frame, register frame, or save any preserved registers. The instructions in the body region may do anything that does not invalidate the stack frame or modify any of the saved preserved registers. Thus, the runtime needs to know only the state of the frame for the entire region, and the relative location of the IP within the region is irrelevant. Most procedures include a single prologue followed by one or more body regions. However, there are instances when a procedure may have more than one prologue.

Illustrative Operating Environment

Figure 1:
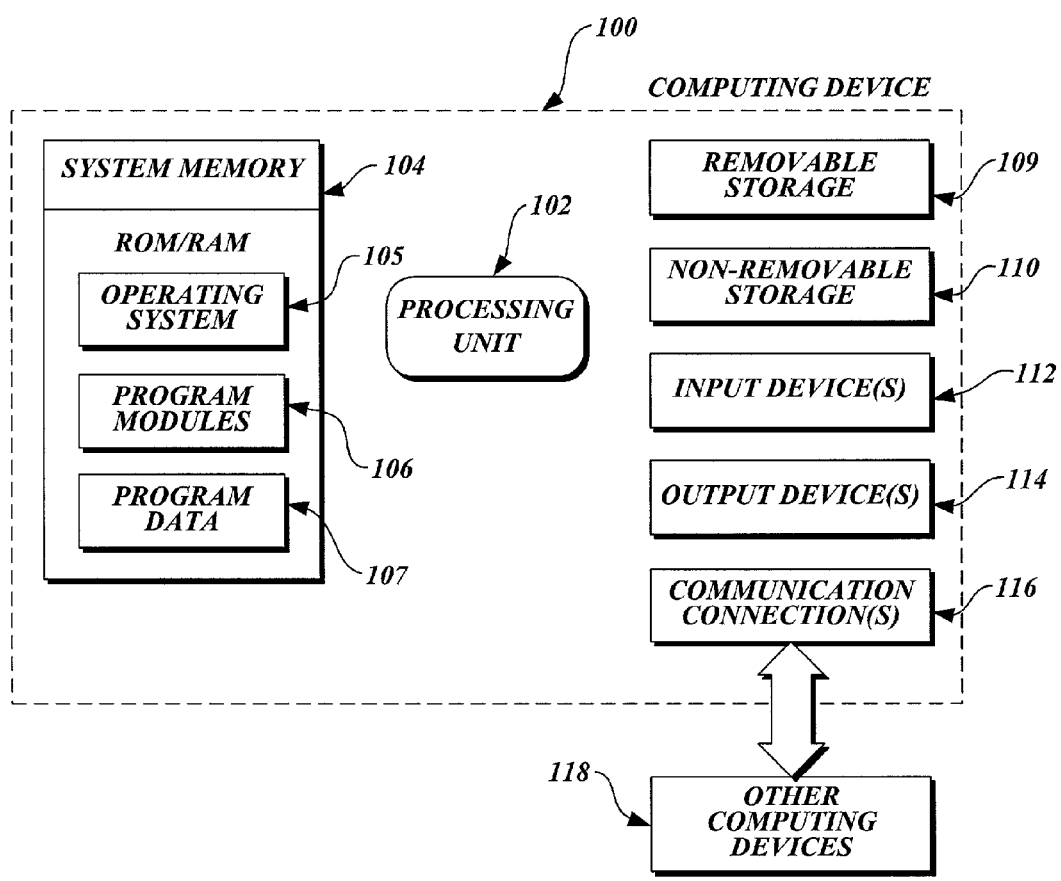
FIG. 1 is a block diagram of an exemplary system for practicing the present invention.

FIG. 1 shows an exemplary system for practicing the present invention, according to one embodiment of the invention. As seen in FIG. 1, the system includes computing device 100. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, system memory 104 may be volatile (such as RAM), non-volatile (such as ROM, flash memory, etc.), or some combination of the two. System memory 104 typically includes an operating system 105, one or more program modules 106, and may include program data 107. Components of system memory 104 are discussed in more detail in conjunction with FIG. 2.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, and the like, may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
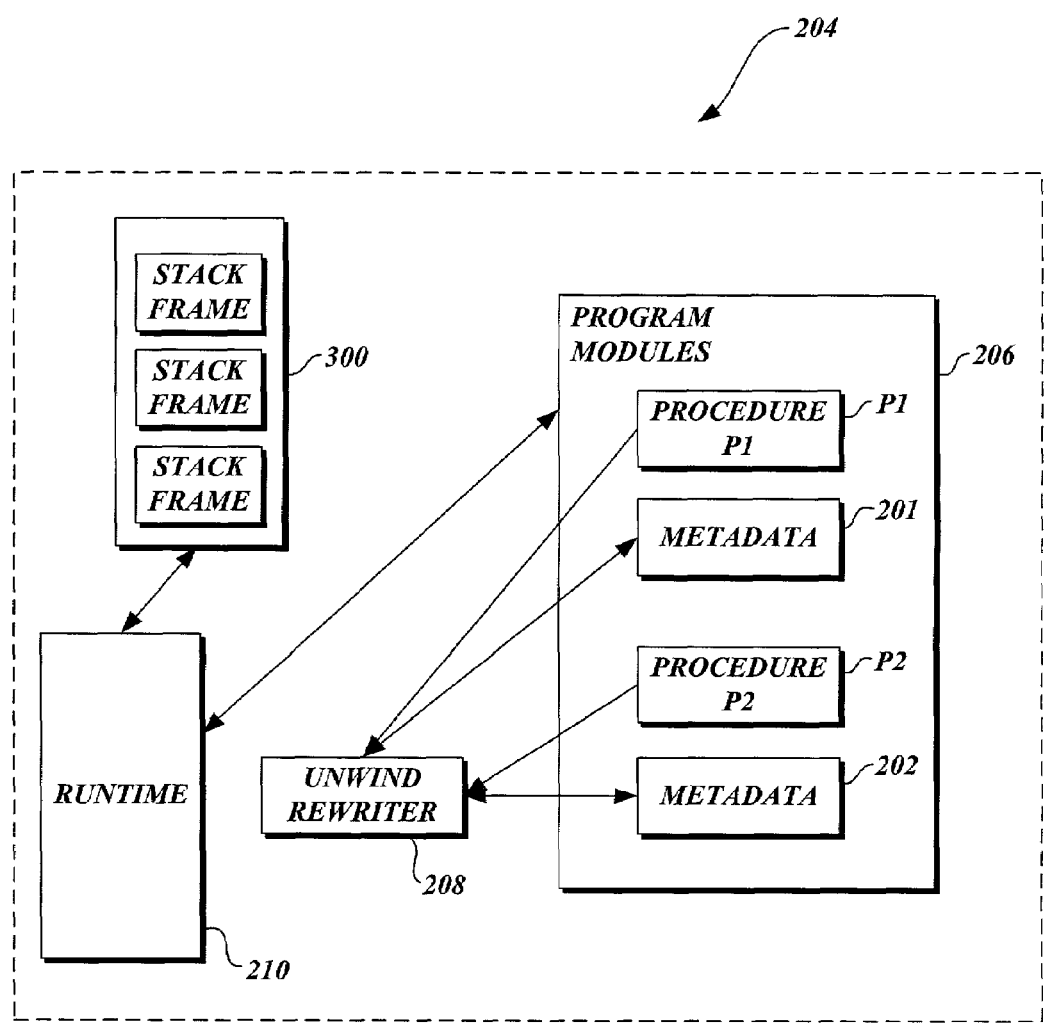
FIG. 2 is a block diagram of an embodiment of system components of the present invention employing an unwind rewriter to regenerate unwind data.

FIG. 2 shows a functional block diagram of system components employing an unwind rewriter to rewrite procedure metadata (unwind data), according to one embodiment of the invention. As shown in the figure, system components 204 includes program modules 206, stack region 300, unwind rewriter 208, and a runtime 210. Program modules 206, described above in conjunction with FIG. 1, include two procedures P1 and P2, and metadata 201-202. Each of the system components 204 typically execute within system memory 104 of FIG. 1.

Figure 3:
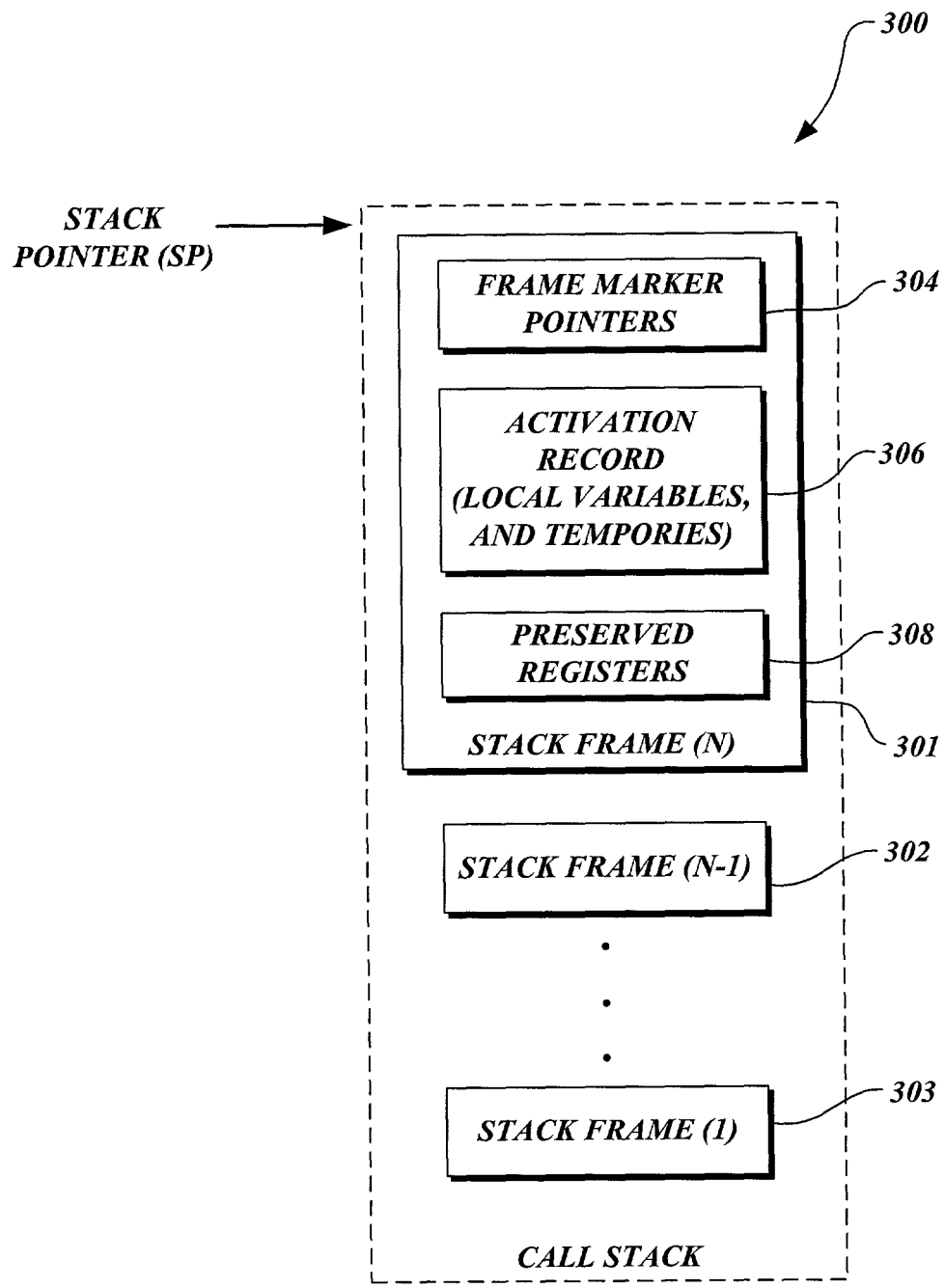
FIG. 3 is a schematic diagram of an embodiment of a stack region in a program's address space.

Stack region 300 is discussed in detail in conjunction with FIG. 3. Briefly, however, stack region 300 includes a call stack, which as previously described, contains information about the sequence of called procedures currently active in system memory 104.

Figure 4:
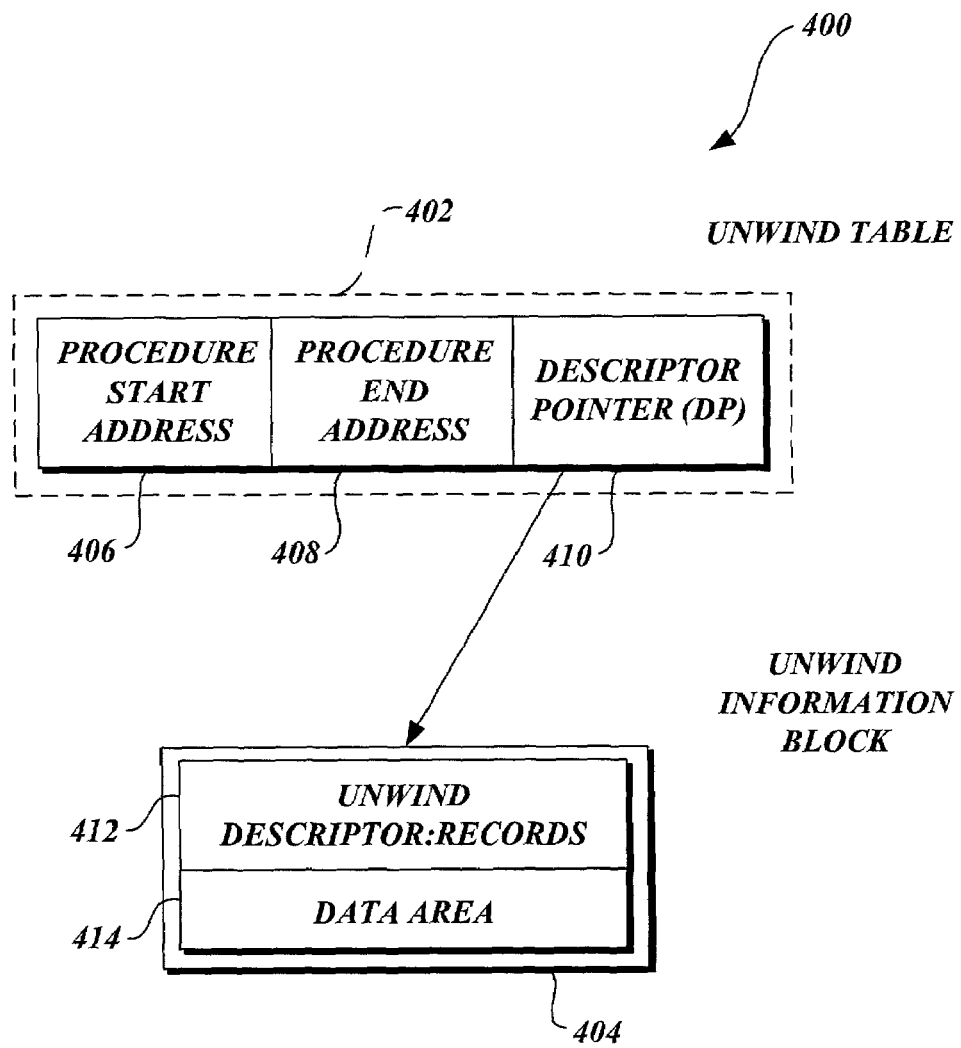
FIG. 4 is an illustration of one embodiment of a metadata structure employed by a runtime to unwind a call stack during an exception or similar interrupt.

The metadata is discussed in detail in conjunction with FIG. 4. Briefly, however, metadata 201-202 include data structures that describe the working state or context (i.e., the runtime semantics) of a contiguous sequence of instructions of a procedure. Metadata 201 provides descriptions related to procedure P1, while metadata 202 provides descriptions related to procedure P2. Metadata 201-202 are employed by runtime 210 during an interrupt, such as an exception, to unwind a call stack.

Runtime 210 receives notifications from operating system 105 in FIG. 1 that an exception has occurred. It is further programmed to unwind stack region 300 in response to such a notification. Runtime 210 can access the appropriate metadata 201 or 202 stored in program modules 206. Runtime 210 is also programmed to create state records (not shown) describing the locations of relevant variables, registers, and the like.

Unwind rewriter 208 reconstructs metadata 201-202 when binary code of procedure P1 or procedure P2 has been perturbed. Unwind rewriter 208 receives information about basic blocks (not shown) for procedures (P1 and P2) along with metadata 201-202. Unwind rewriter 208 evaluates the impact of the code perturbation upon metadata 201-202 and rewrites metadata 201-202 as though the basic blocks were unperturbed.

Illustrative Stack Region

FIG. 3 is a schematic illustrating stack region 300 defined in a program's address space included within operating system 105 shown in FIG. 1. Stack region 300 includes a call stack of N stack frames) 301-303. Each stack frame 301-303 represents and includes data concerning a specific procedure that has been called during execution of a program. Each stack frame 301-303 is created and placed in the call stack when a procedure is called. As illustrated in FIG. 3, the procedure associated with stack frame (N–1) 302 called the procedure associated with stack frame (N) 301. When a procedure is exited, the stack frame associated with that procedure is popped (i.e., removed) from the call stack.

Stack frame 301 includes frame marker pointers 304, an activation record 306, and preserved registers 308. The frame marker pointers 304 include such pointers as a pointer to preceding stack frames, and a pointer to a return point in the calling procedure. Activation record 306 includes information related to a local state associated with a procedure that must be saved in memory. Such information includes local variables and tempories. Preserved registers 308 include information that must be saved across procedure calls. Preserved registers 308 must be saved and restored by a callee procedure, if used, and must not be modified by a procedure call.

Illustrative Stack Unwind Information

In most operating systems, the process of unwinding the call stack commences with an initial context record that describes the process state of the most recently executed procedure, at the point of an interruption, such as an exception. Information needed to properly reconstruct a context record is recorded by compilers in static unwind data (metadata), stored in the text segment of the program itself.

FIG. 4 is a detailed illustration of a metadata structure as introduced in FIG. 2, according to one embodiment of the present invention. As seen in FIG. 4, metadata 400 includes an unwind table 402, and a variable-size unwind information block 404.

Unwind table 402 includes procedure start address 406, procedure end address 408, and descriptor pointer (DP) 410. The first two fields of unwind table 402 identify the starting and ending addresses of the procedure with which unwind table 402 corresponds. Descriptor pointer (DP) 410 is a pointer to the unwind information block 404 that the runtime employs to reconstruct a context during the stack unwind.

Figure 5:
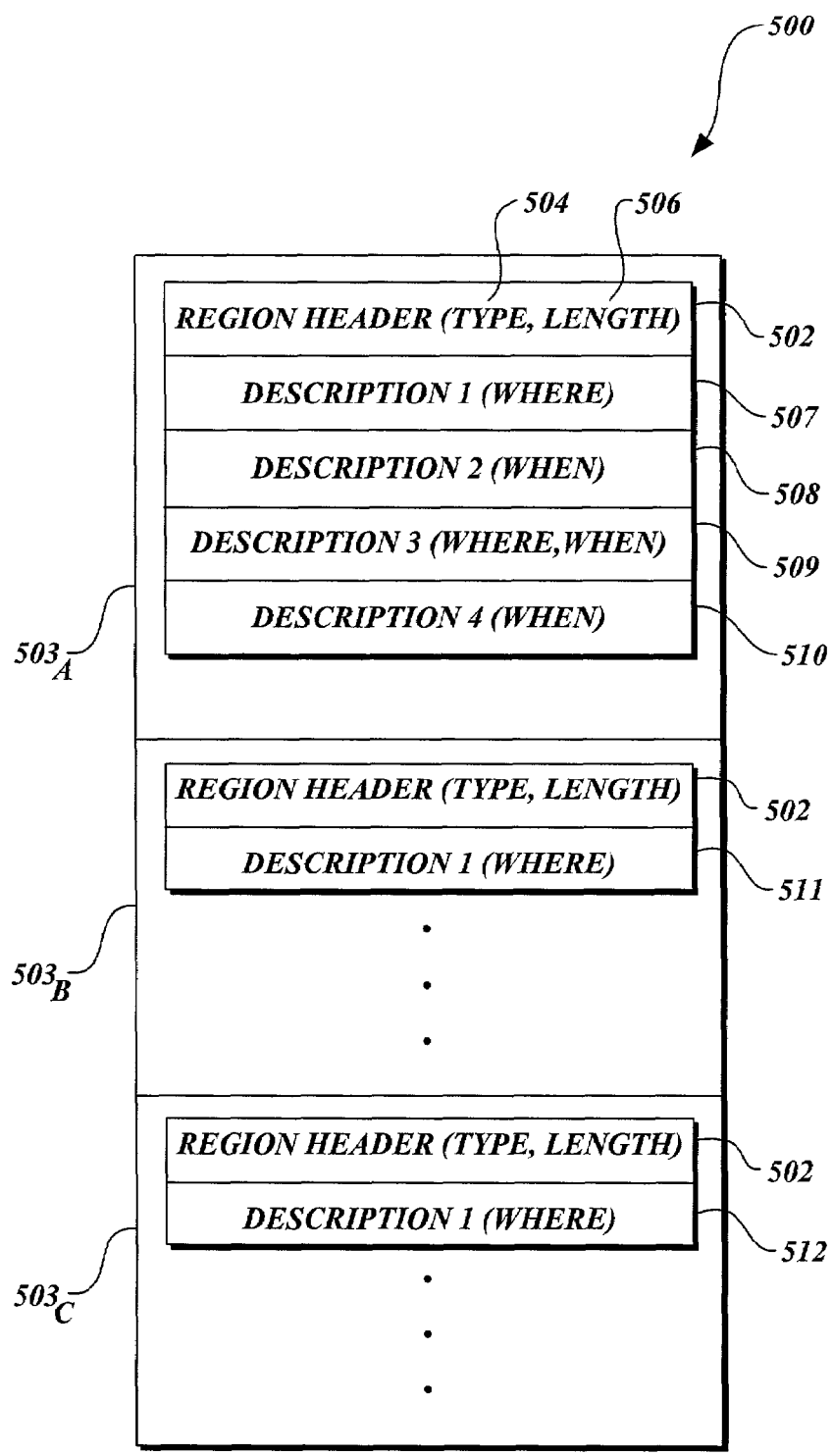
FIG. 5 is an illustrative example of unwind descriptor records as shown in FIG. 4.

Unwind information block 404 includes a collection of unwind descriptor records 412, which are described in more detail in conjunction with FIG. 5, and an optional language specific data area 414.

FIG. 5 is an illustrative example of unwind descriptor records 500 as shown in FIG. 4. Unwind descriptor records 500 include regions $503_{A\text{-}C}$, which represent an ordered set of records describing actions over a contiguous region of code in a procedure. Regions $503_{A\text{-}C}$ include region header descriptor 502, and any number of action description records 507-512. Region header descriptor 502 includes type field 504, which indicates the record as being either a prologue region descriptor record or body region descriptor record, and length field 506 for the group of records.

Any number of action description records 507-512 may be included to describe various actions relating to an associated procedure. An action is a description of "when" (i.e., the distance in slots or instructions from the beginning, or end of a region, to an instruction) or "where" (i.e., a register or memory location) a preserved register is saved, that is required for successful unwind of the call stack. Action description records 507-512 can be either a 'when' action description record, a 'where' action description record, or both a 'where' and a 'when' action description record.

Although conventionally, the exact structure or format of region header descriptor 502 and action description records 507-512 are determined by a particular compiler's architectural conventions, the present invention is not so limited. So long as a metadata structure is communicated to unwind rewriter 208 of FIG. 2, a variety of a metadata structures can be employed, without departing from the spirit or scope of the present invention.

Illustrative Procedure Descriptions

FIG. 6 is an illustrative example of two procedures P1 and P2 decomposed into their contiguous basic blocks. Procedures P1 and P2 are substantially similar to procedures P1 and P2 shown in FIG. 2.

Procedure P1 includes basic blocks BB11-BB15. Procedure P2 includes basic blocks BB21-BB24. In the figure, procedure P1 is illustrated to have a procedure start address at X and a procedure end address at Y. Procedure P2 is shown to have a procedure start address at S and a procedure end address at T.

The basic blocks for each procedure are grouped into code regions of prologue, body, and a body epilogue. Prologue regions and body regions have been described above. In procedure P1, prologue region P11 includes basic blocks BB11 and BB12. This is because, in the example in FIG. 6, BB11 and BB12 include the code responsible for allocating the preserved registers and stack frame. Similarly, in procedure P2, the first basic blocks BB21 is included in prologue region P21. Basic blocks BB13-BB14 of procedure P1 are allocated to body region B11, while basic blocks BB22-BB23 of procedure P2 are allocated to body region B21.

Basic block BB15 are allocated to epilogue body region B12 for procedure P1, and similarly, basic block BB24 has been allocated to epilogue body region B22 for procedure P2. Epilogue body regions are responsible for restoring the return values and previous function state, and any preserved registers upon exiting a procedure.

Figure 7:
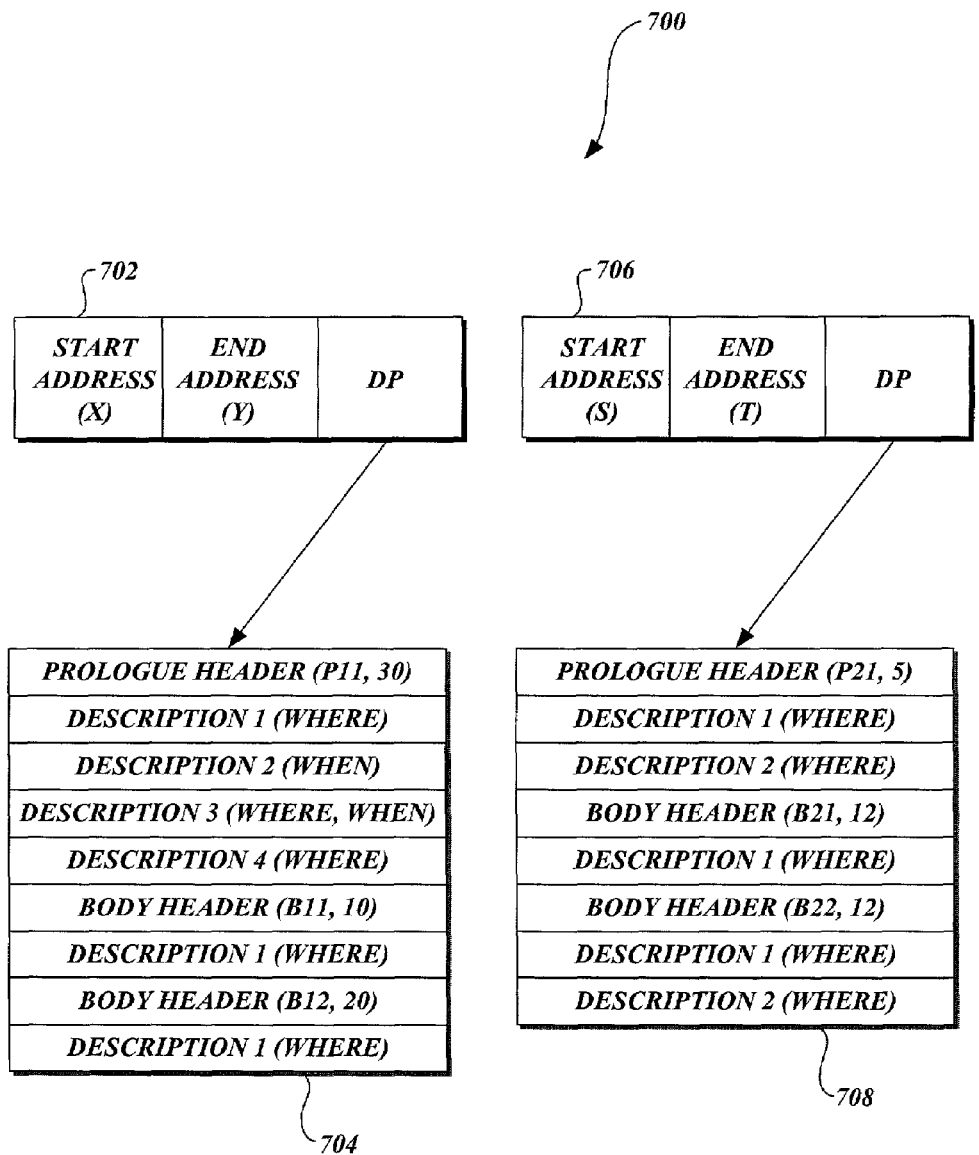
FIG. 7 is an illustrative example of unwind tables and unwind information blocks for the two procedures shown in FIG. 6.

FIG. 7 shows illustrative examples of metadata structures for procedures P1 and P2 of FIG. 6. Unwind table 702 and unwind descriptor records 704 are associated with procedure P1 of FIG. 6. Unwind table 706 and unwind descriptor records 708 are associated with procedure P2 of FIG. 6.

The statement "Prologue Header (P11, 30)" in FIG. 7 indicates that prologue region P11 is of slot (or instruction) length 30. The unwind descriptor records 704 also include four action description records. The statement "body header (B11, 10)" indicates that the body region B11 for procedure P1 is of slot length 10. The statement "body header (B12, 20)" indicates that Epilogue body region B12 for procedure P1 is of slot length 20.

Similarly, shown in unwind descriptor records 708 for procedure P2, the statement "Prologue Header (P21, 5)" indicates that prologue P21 is 5 instructions long. The statement "body header (B21, 12) indicates that body region B21 is of length 12 instructions. Additionally, the statement "body region (B22, 12)" indicates that epilogue body region B22 is 12 instructions in length.

Generalized Operation

Figure 8:
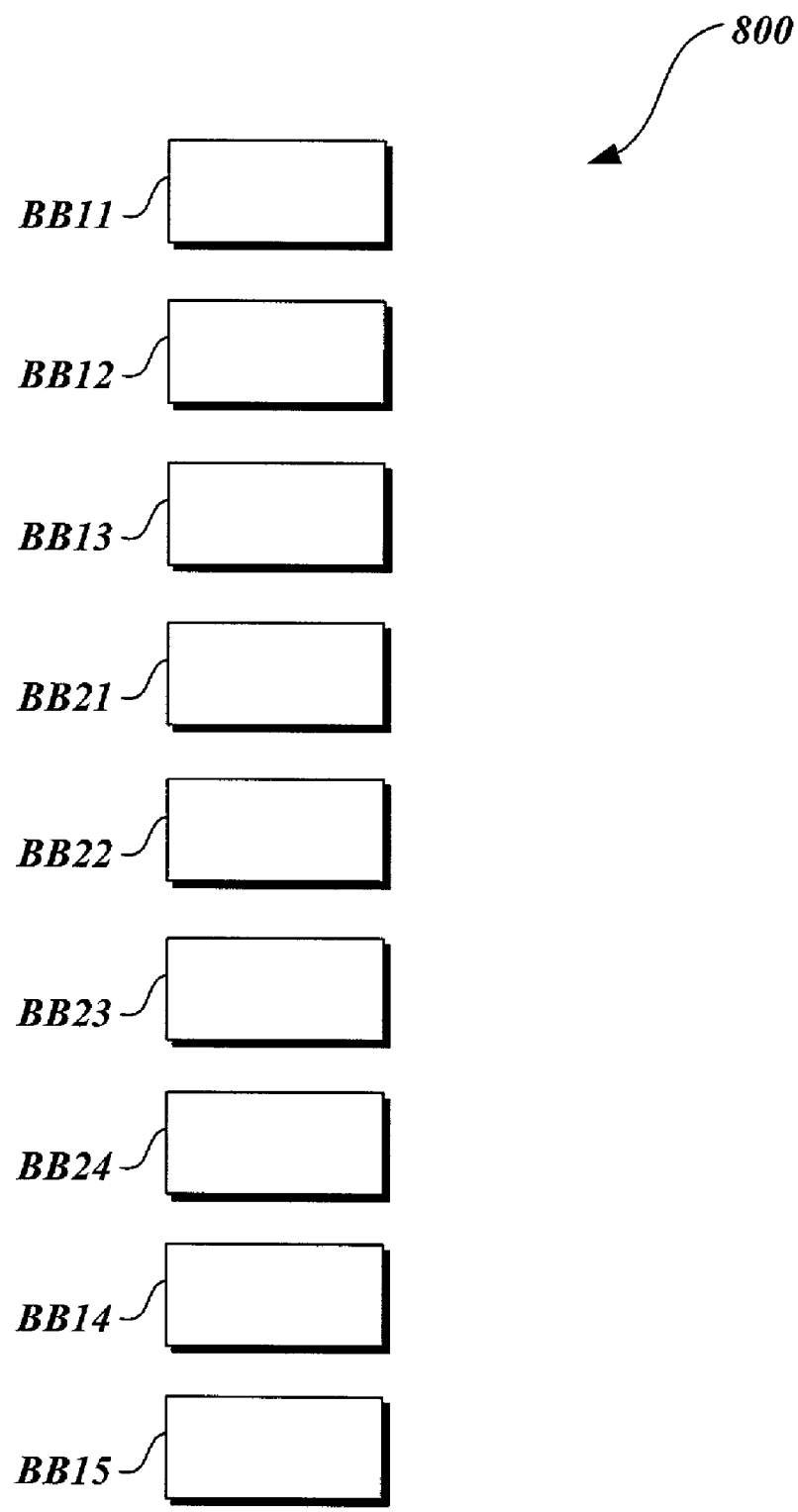
FIG. 8 is an example illustrating a reordering of basic blocks of the two procedures shown in FIG. 6.

Operationally, the unwind process typically starts when an exception or similar interrupt occurs at some IP. The runtime employs the IP to locate the unwind table and unwind description records. The unwind description records are sequentially processed one at a time until the IP is found to fall into the range of addresses covered by the current region. When the IP is contained in the current region the unwind data processing is terminated. Success of the unwind process is premised on the runtime 'thinking' that the procedure binary code is contiguous. However, for several reasons, the basic blocks of a procedure may have been reordered relative to their initial positions. FIG. 8 is an example illustrating a reordering of basic blocks of procedures P1 and P2 of FIG. 6. When the basic block order has been perturbed, the existing unwind tables and descriptors no longer accurately represent the sequence of instructions and, therefore, must be regenerated for the unwinding process to work correctly.

The operation of regenerating unwind data (metadata) will now be described with respect to FIGS. 9-12, which are flowcharts illustrating one embodiment of a process of the present invention. FIGS. 6-8 and 13-15 are employed to provide an illustrative example to further aid in illustrating the flowcharts.

It will be understood that each block of the flowchart illustrations (FIGS. 9-12), and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block 5 or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 9:
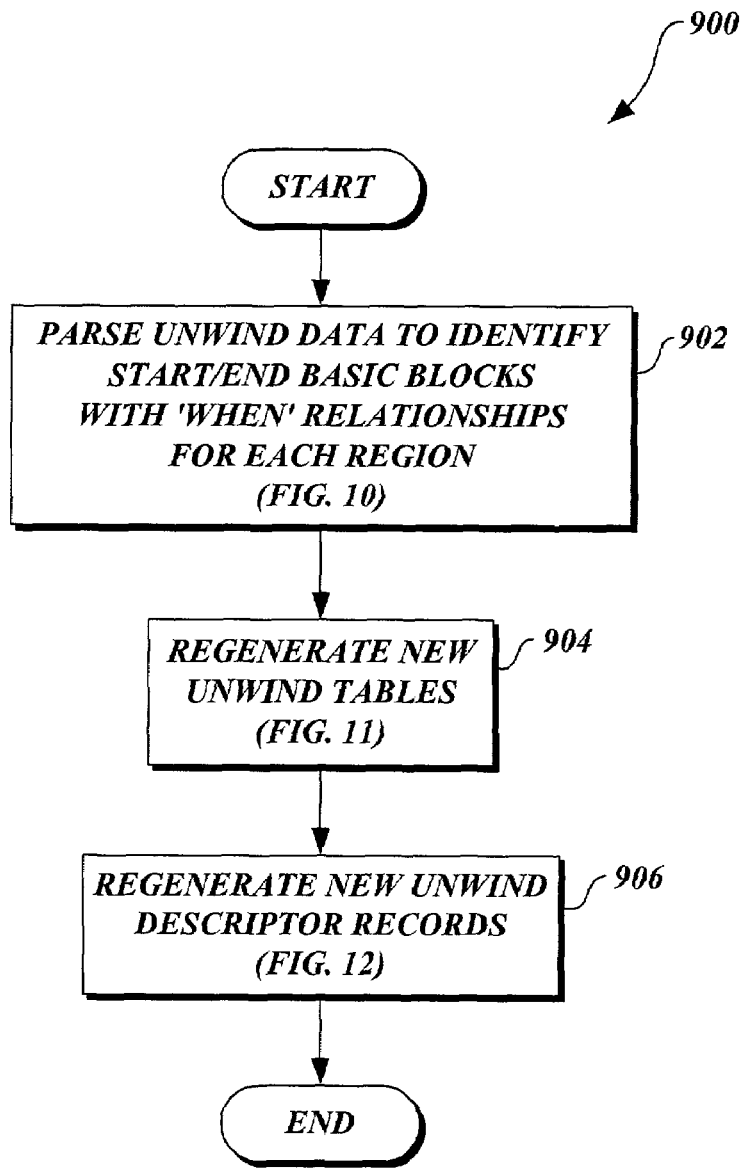
FIG. 9 is a flow diagram generally showing an embodiment of a process of rewriting unwind data.

FIG. 9 illustrates a logical flow diagram generally showing one embodiment for rewriting unwind data, in accordance with the present invention. The regenerate unwind data process 900 begins, after a start block, at block 902, which is discussed in detail in conjunction with FIG. 10. Briefly however, block 902 parses the existing unwind data to identify the start and end basic blocks for the region headers associated with each procedure in a binary file. The results of block 902 are recorded in a per procedure side table.

Figure 11:
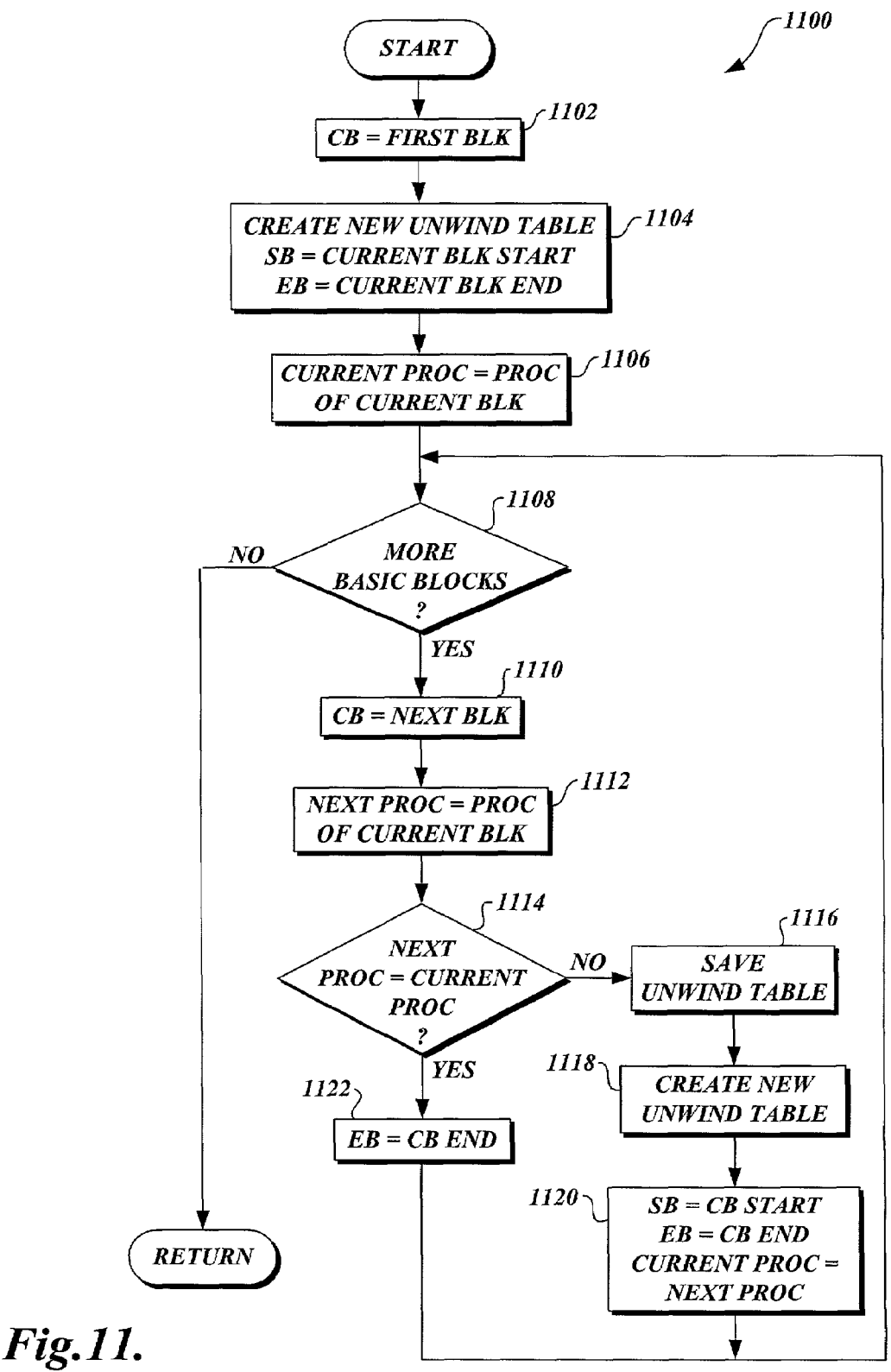
FIG. 11 is a flow diagram illustrating an embodiment of a process of regenerating unwind tables.

Process control continues at block 904, which is discussed in detail in conjunction with FIG. 11. Briefly, however, block 904 employs the procedure side tables generated at block 902 to traverse the basic blocks of the binary file in order and associate them with new unwind tables. Each new unwind table describes only basic blocks that were covered by the same original unwind table. Process control continues to block 906.

Figure 12:
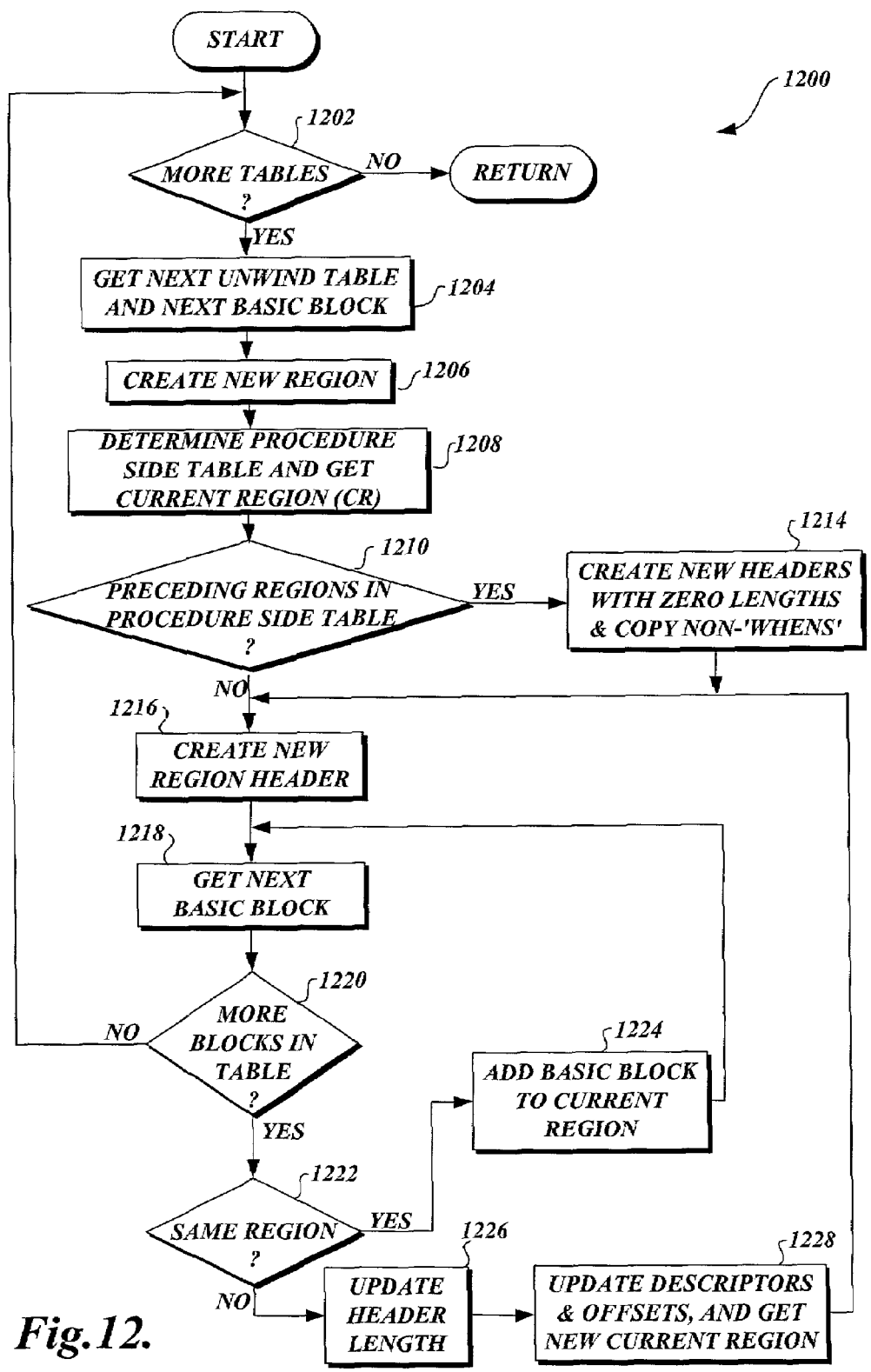
FIG. 12 illustrates a flow diagram for generating new unwind descriptors based on the new unwind tables created in conjunction with FIG. 11.

Block 906 is illustrated in detail in FIG. 12 and described in the related discussion. Briefly, however, block 906 employs the new unwind tables from block 904 and the procedure side tables from block 902 to create new unwind descriptor records including new region headers for each of the new unwind tables. Upon completion of block 906, the logical process control flow ends.

Parsing Unwind Data

Figure 10:
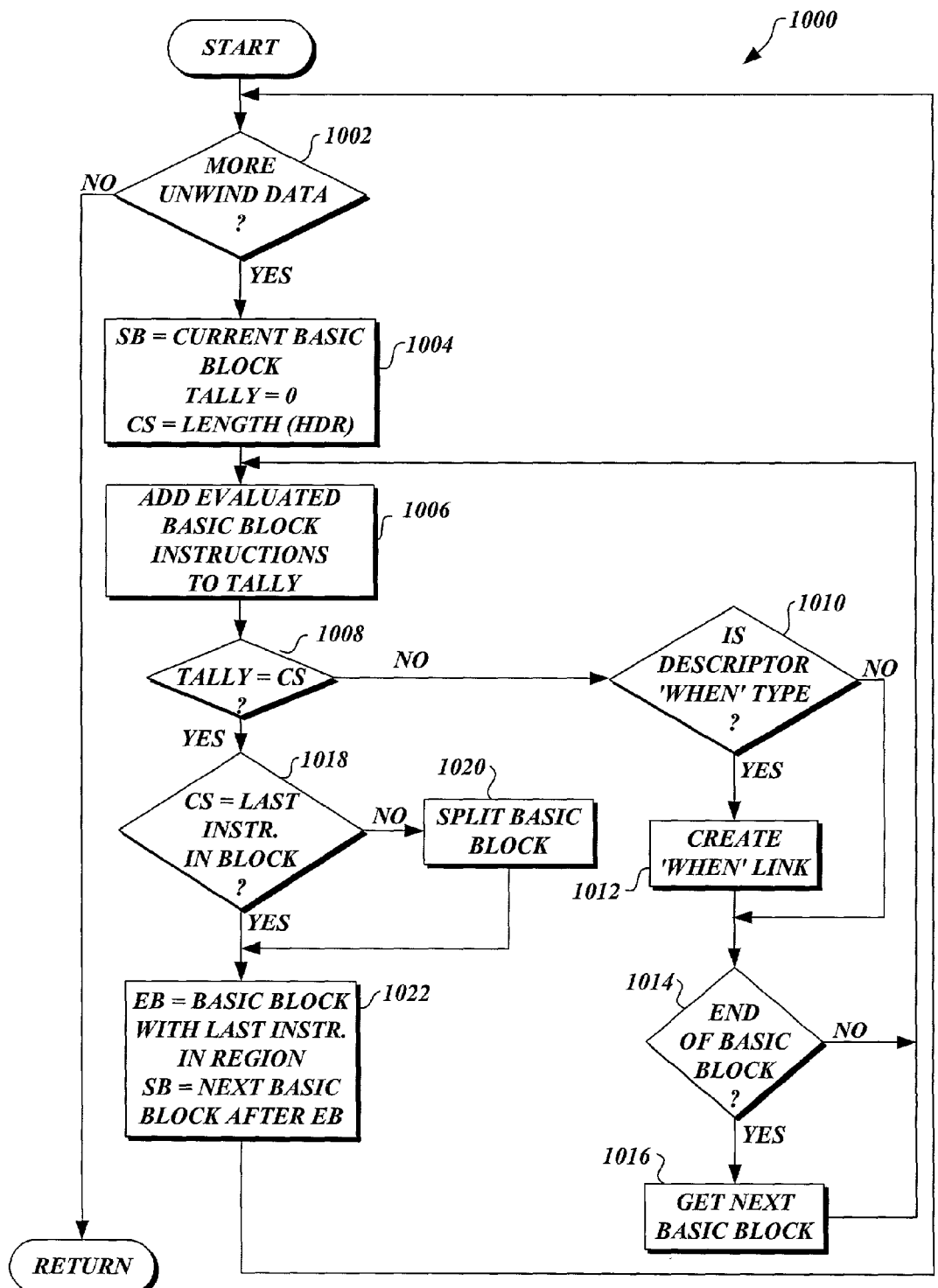
FIG. 10 is a flow diagram illustrating an embodiment of a process of parsing unwind data to identify a start and an end basic block for each region header descriptor along with creating references to 'when' fields.

FIG. 10 illustrates a logical flow diagram for parsing unwind data to identify the start and end basic blocks for each region header along with creating references to 'when' action description records, described above at block 902 in FIG. 9, in accordance with the invention.

Process 1000 of FIG. 10 begins, after a start block, at decision block 1002 where a determination is made whether more original unwind data exists to be parsed. If no more unwind data exists that needs to be parsed, process 1000 returns to block 904 (shown in FIG. 9) to perform other actions.

In the alternative, if more unwind data is to be parsed, the process control proceeds to block 1004. On the first pass through parsing process 1000, the determination should be that more unwind data exists for parsing.

At block 1004, a start marker block (SB) is set to the start address of the first basic block in a procedure. Because unwind data is typically in ascending order with respect to a procedure's addresses, the first region header is associated with the first basic block of the procedure. Thus, SB is set to the first region header basic block start address of a procedure. Further, SB is saved in a procedure side table for the current procedure.

Additionally at block 1004, a variable CS is set to the length identified in the region header associated with the current address within the procedure. CS is used in process 1000 to locate the end marker block. Moreover, a running tally (TALLY) is set to zero, as an instruction counter. The process control proceeds to block 1006.

At block 1006, the instructions of the current basic block that have been evaluated are added to the TALLY of instruction counts. Process control continues to decision block 1008.

At decision block 1008, it is determined whether TALLY is equal to the length of the region header (CS). If it is determined, that TALLY does equal CS, process control proceeds to decision block 1018. TALLY equals CS when each of the instructions in a given region header have been evaluated.

At decision block 1018, it is determined whether the last instruction in the current basic block is the end of the region header (CS). In other words, a determination is made whether the region boundary coincides with a basic block boundary. If the last instruction in the basic block is also the end of the region header, process control continues to block 1022.

Alternatively, at decision block 1018, if the end of the region header is not also the last instruction in the current basic block, process control proceeds to block 1020.

At block 1020, the current basic block is split into two basic blocks, such that the first basic block ends on the last instruction of the region header. The instructions following the region header instructions, up to the end of the original basic block, are moved into the newly created basic block. The new basic block is inserted into the procedure following the end marker block (EB). The splitting of a basic block is directed at improving the efficiency of reordering unwind data. Process control continues to block 1022.

At block 1022, the end marker block for the region header is identified as the block that contains the last instruction of the region as determined by the above counting procedure. EB for the current region header is saved in the procedure side table for the current procedure. The current block now becomes the block that follows EB. Process control returns to decision block 1002, where the process continues as described above.

Back at decision block 1008, if it is determined that the TALLY is not equal to CS, that is the end of the basic block may have been reached before the tally equals the region length, process control proceeds to block 1010.

At decision block 1010, it is determined whether the unwind information block associated with the current block of instructions includes 'when' action description records. If it is determined that the current unwind information block does not include 'when' action description records, process control proceeds to decision block 1014.

Alternatively, if at decision block 1010, it is determined that the current block contains 'when' action description records, process proceeds to block 1012, where a connection or pointer link is established between the 'when' descriptor and the corresponding instruction in the basic block. The connection or pointer links are saved in a procedure side table for each procedure for use during regeneration of the metadata. The process control continues to decision block 1014.

At decision block 1014, it is determined whether all the instructions in the current basic block have been evaluated. If the process has reached the end of the current basic block before TALLY equals the region header length, process control proceeds to block 1016, where the next basic block is fetched.

At block 1016 once the next basic block is fetched for evaluation, process control returns to block 1006, where the process continues as described above.

Alternatively, if at decision block 1014, it is determined that not all the instructions in the current block have been processed, process control returns to block 1006, where the process continues as described above.

Upon completion of parsing process 1000, for each region header in a procedure a start and an end address is recorded in a procedure side table, along with a set of pointers connectors or pointers linking procedure instructions and 'when' action description records.

Regenerating Unwind Tables

FIG. 11 illustrates a logical flow diagram of regenerating unwind tables, described above at block 904 in FIG. 9, in accordance with one embodiment of the present invention. Briefly, process 1100 of FIG. 11 is directed at traversing in order, the basic blocks in a binary program module, such as shown in FIG. 8. The process groups the basic blocks such that all the basic blocks in a group are covered by the same original unwind table. The resulting groupings enable the creation of a new unwind table for each grouping of basic blocks.

Process 1100 of FIG. 11 begins, after a start block, at block 1102. At block 1102, a variable CB is set to identify the first basic block of the perturbed binary program module. Process control proceeds to block 1104.

At block 1104, a new unwind table is created for the procedure associated with the current basic block. Additionally, the new unwind table is initialized with a procedure start address (SB) equal to the start address of the current basic block, and a procedure end address (EB) equal to the end address of the current basic block. Process control continues to block 1106.

At block 1106, the original procedure containing the current basic block is identified and is marked as the current procedure. Process control continues to decision block 1108.

At decision block 1108, a determination is made whether there are more basic blocks to be traversed by the process. If no more basic blocks exist, the process is finished, and control returns to block 906 in FIG. 9, where that process continues as described above.

Alternatively, if at decision block 1108 it is determined that more basic blocks are to be traversed, process control proceeds to block 1110.

At block 1110, the next basic block in the sequence of basic blocks is accessed and the variable CB is incremented to the next basic block. Process control continues to block 1112.

At block 1112, the original procedure containing the next basic block is identified and is marked as the next procedure. Process control continues to decision block 1114.

At decision block 1114, a determination is made whether the next procedure is the same as the current procedure. That is, a determination is made whether the two basic blocks belong to the same procedure. If it is determined that the two basic blocks belong to the same procedure, process control proceeds to block 1122.

At block 1122, the procedure end address (EB) in the current unwind table is moved to the end address of the next basic block. Process control returns to decision 1108, where the process continues as described above.

Alternatively, if at decision block 1114 it is determined that the current procedure and the next procedure are not the same (i.e., the two basic blocks are associated with different procedures), process control proceeds to block 1116.

At block 1116, the current unwind table is saved. This unwind table is associated with one grouping of basic blocks. Process control continues to block 1118.

At block 1118, a new unwind table is created, and the process continues to block 1120 where the procedure start address (SB) and procedure end address (EB) for the new unwind table are set equal to the start and end addresses for the next basic block (CB start and CB end, respectively). Additionally, the current procedure is set equal to the next procedure. Process control loops to decision block 1108, where the process iterates until the entire binary program module is traversed and each basic block associated with an original unwind table is associated with a new unwind table.

Regenerating Unwind Descriptors

FIG. 12 illustrates a logical flow diagram for generating new unwind descriptors based on the new unwind tables created in conjunction with FIG. 11, in accordance with one embodiment of the present invention. Briefly, process 1200 of FIG. 12, employs the procedure side tables generated by process 1000 of FIG. 10, and the new unwind tables from process 1100 of FIG. 11, to coalesce basic blocks into new regions if the basic blocks originally shared the same unwind data. Process 1200 further creates new region headers and action description records for each new region of a procedure.

Process 1200 of FIG. 12 begins, after a start block, at decision block 1202, where a determination is made whether more unwind tables exist for which unwind data are to be rewritten. If it is determined at decision block 1202 that no more unwind tables are to be processed, process control returns to block 906 of FIG. 9, where that process continues as described above.

Alternatively, if it is determined at decision block 1202 that more unwind tables are to be processed, process control continues to block 1204. At block 1204, the next unwind table is accessed and the start block described in the unwind table is employed as the current basic block. New regions are created for all the blocks in the closed interval between the start and end block of the unwind table. Process control proceeds to block 1206.

At block 1206, a new region is created that is associated with the current basic block. Process control continues to block 1208.

At block 1208, the identity of the procedure side table associated with the current basic block is located. Using the procedure table a current region (CR) is found that is associated with the current basic block. Process control proceeds to decision block 1210.

At decision block 1210, it is determined whether there are any regions in the procedure side table that precede CR. The ordering of the regions in the side table is controlled by the original order. The parsing phase described earlier maintains this order in the procedure side table. If an earlier region header has been created, then additional processing must be included to ensure that their unwind descriptors get processed when the stack is unwound. Therefore, if it is determined at decision block 1210 that there exists preceding regions for the current procedure side table, process control proceeds to block 1214.

At block 1214, for each region that preceded the CR in the order of the procedure side table a new region header is created with a zero length. Additionally, any non-'when' action description records are copied from the original unwind descriptor records into new unwind descriptor records. Process control proceeds to block 1216.

Alternatively, if at decision block 1210 it is determined that no other regions preceded CR in the procedure side table for the current basic block, process control continues to block 1216.

At block 1216, a new region header is created with an undetermined length. Because the original and new region type for any given basic block is the same, establishing the type of a new region header involves extracting the type from the CR data structure. Process control proceeds to block 1218.

At block 1218, a next basic block after the current basic block is fetched. Process control proceeds to decision block 1220 where it is determined if more basic blocks exist for the current unwind table. If it is determined that no more basic blocks exist for the current unwind table, process control returns to decision block 1202, to determine if there are more unwind tables, as described above.

Alternatively, if at decision block 1220 it is determined that the next basic block is associated with the current unwind table, process control moves to decision block 1222.

At decision block 1222, it is determined whether the next basic block belongs to CR. If it is determined that the next basic block does belong to CR, process control continues to block 1224.

At block 1224, the next basic block becomes the end block (EB) for the new region. Process control returns to block 1216, to continue as described above.

Alternatively, if at decision block 1222 it is determined that the next basic block does not belong to CR, process control moves to block 1226.

At block 1226, the region header length is calculated by counting the instructions in the set of basic blocks comprising the new region. Process control moves to block 1228.

At block 1228, all the descriptors from the CR are copied to the new descriptors for the new region header. The time fields for the 'when' action description records are modified by locating the 'when' action description records in the basic blocks of the new region and calculating the distance in instructions from either the top or bottom of the region. The distance calculated is employed as the new length for the region. At this step in process 1200, a region header and its set of descriptors have been recreated. From the procedure side table, the region associated with the current basic block becomes the CR. Process 1200 iterates until all the basic blocks in the new unwind table, and all unwind tables have been exhausted, at which point the process of generating new unwind data is complete, such that the new unwind data accurately represents the same runtime semantics as that of the unmodified (unperturbed) basic blocks.

ILLUSTRATIVE EXAMPLE

An illustrative example of a generalized operation of the above-described embodiment of the present invention is provided next.

Referring to FIG. 6, the example begins where the original unwind data is parsed by fetching the first basic block (BB11) in procedure P1. Referring to FIG. 7, unwind descriptor records 704 are employed in determining that basic block BB11 is part of a prologue region having a length of 30 instructions. The process adds to a running tally the instruction count within basic block BB11 to determine whether the full 30 instructions for the prologue have been reached. In the example, basic block BB11 does not include the full prologue region for P1. Therefore, the process evaluates the region associated with the current basic block BB11 to determine if a 'when' action description record is included. If the process discerns that a 'when' action description record is included, it notes that fact within a procedure side table. The process continues through the instructions in basic block BB11, adding the count to the tally until the end of basic block BB11 has been reached.

Then, the next basic block BB12 is fetched. In the example, basic block BB12 concludes the prologue region P11 for procedure P1. If however, the prologue length ended at some instruction count within basic block BB12, basic block BB12 may be split into two basic blocks at the last instruction for the prologue region P11. The new basic block would be included in the next region header count.

All the basic blocks for procedures P1 and P2 are analyzed in this manner, creating "'when' links" and parsing basic blocks into prologue regions, body regions, and epilogue body regions.

Figure 13:
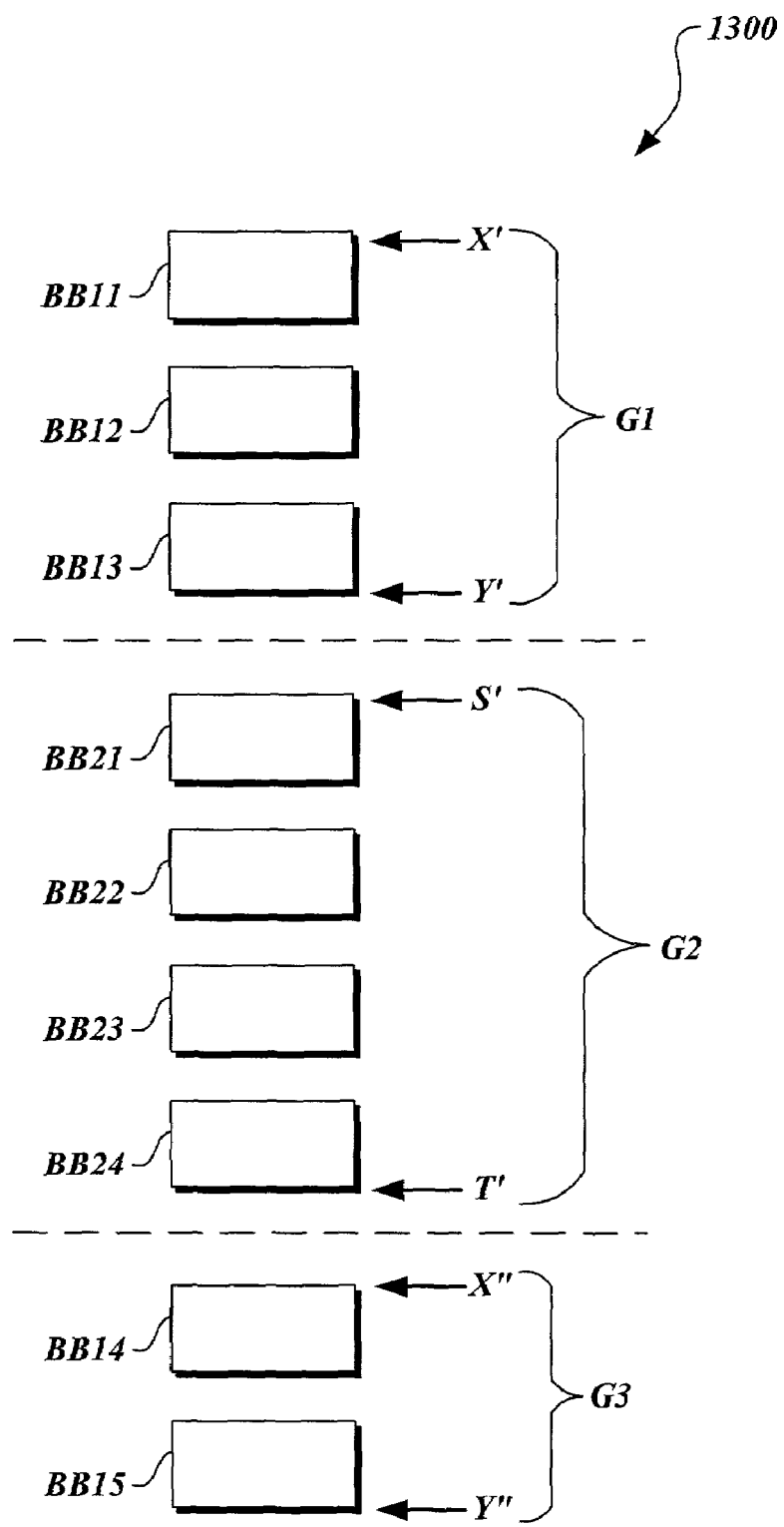
FIG. 13 is an illustrative example of one grouping of reordered basic blocks shown in FIG. 8.

Referring now to FIG. 13, beginning with basic block BB11, a new unwind table is created with the procedure start address of basic block BB11 as the start address for the new unwind table. The procedure end address for the unwind table is set equal to the end address of basic block BB11. If basic block BB12 belongs to the same original procedure as basic block BB11, the procedure end address in the current new unwind table is reset to the end address of basic block BB12.

Then, it is determined that basic block BB13 also belongs to procedure P1, and the procedure end address for the unwind table is again reset to the end address of basic block BB13.

When it is determined that basic block BB21 belongs to a different procedure (that is, procedure P2) than the prior basic blocks (BB11-BB13), the current unwind table is saved. The saved unwind table includes procedure start address (X') associated with procedure P1, and basic block BB11. The unwind table also includes procedure end address (Y') equal to the last instruction of basic block BB13.

A second unwind table is created. The second unwind table is associated with procedure P2, and has a procedure start address (S') equal to the start address of basic block BB21. Each of basic blocks BB22-BB24 are analyzed, resetting the procedure end address of the second unwind table until the basic blocks no longer belong to procedure P2. In the example, it is determined that basic block BB14 belongs to procedure P1, not procedure P2. Therefore, the second unwind table is saved and a third unwind table is created. Ultimately, all of the basic blocks in the program modules will have been assigned to new unwind tables.

Figure 14:
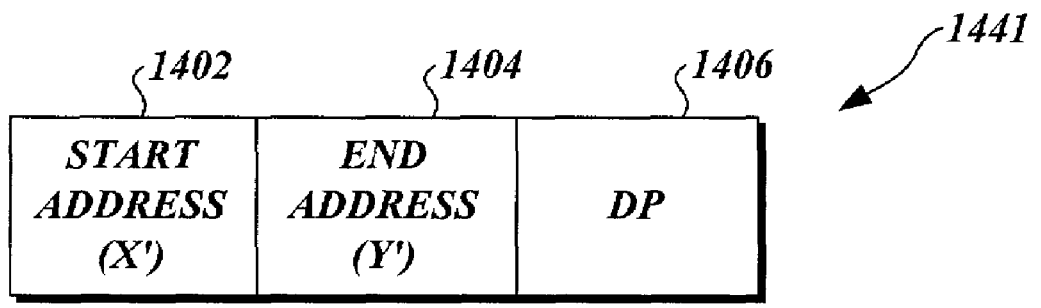
FIG. 14 is an illustrative example of resulting unwind tables for the two procedures shown in FIG. 6.
Figure 14:
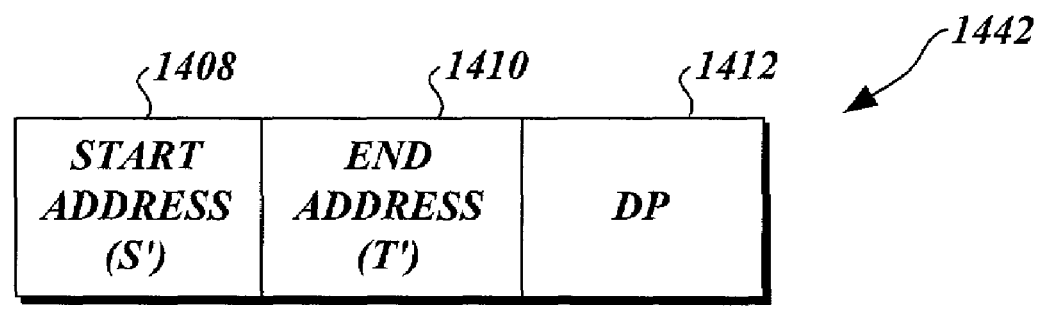
Figure 14:
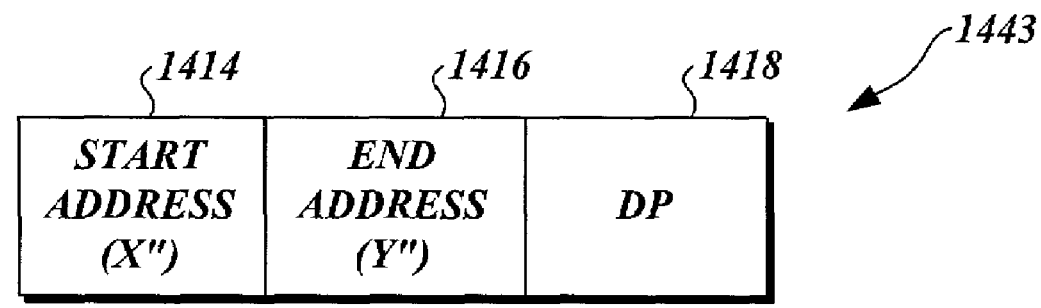

FIG. 14 is an illustration of the resultant three unwind tables 1441-1443 for this example. Unwind table 1441 is associated with the grouping of basic blocks BB11-BB13. Unwind table 1442 is associated with the grouping of basic blocks BB21-24, and unwind table 1443 is associated with the grouping of basic blocks BB14-15. Each grouping appears to the runtime as a contiguous grouping of basic blocks for a procedure.

Next, new unwind descriptor records are generated for unwind tables 1441-1443. The first basic block BB11 for unwind table 1441 is fetched, and it is determined that basic block BB11 belongs to procedure P1.

Figure 15:
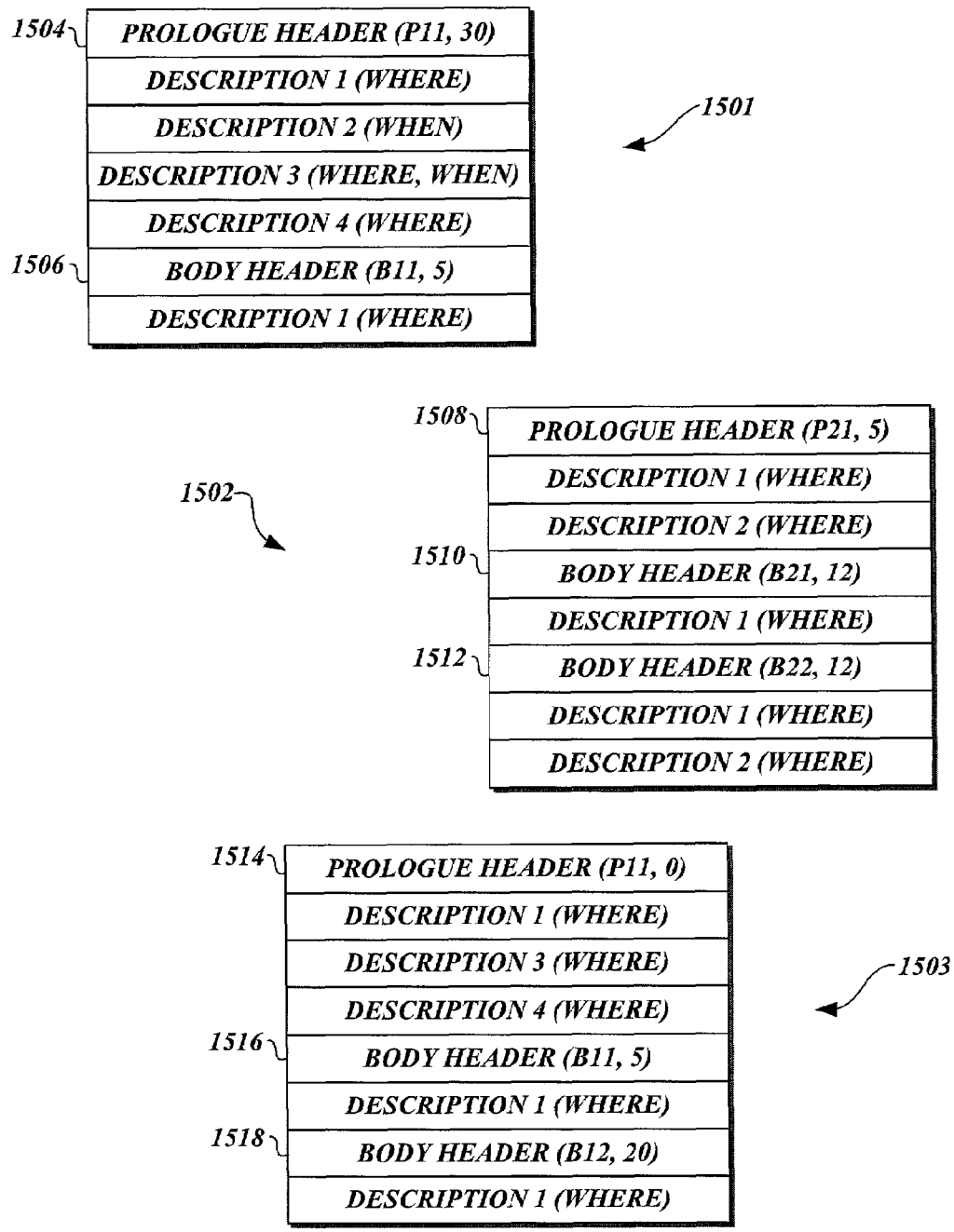
FIG. 15 is an illustrative example of resulting unwind data descriptors for the two procedures shown in FIG. 6, in accordance with the present invention.

Referring to FIG. 15, new unwind descriptor record 1501 is created with new region header 1504. The next basic block BB12 is fetched. A determination is made whether basic blocks BB11 and BB12 belong to the same region. In the example, because basic blocks BB11 and BB12 are both associated with prologue region P11 for procedure P1 (as shown in FIG. 6), information about BB12 is included into prologue header 1504.

Next, it is determined that basic block BB13 belongs to a different region (body region B11, as shown in FIG. 6). The length field for prologue header 1504 is updated to the length of basic blocks BB11 and BB12 (30 instructions, as shown in FIG. 15) and, the action description records for basic blocks BB11-BB12 are copied into the prologue region.

Then a new region header is created for basic block BB13. As shown in FIG. 6, basic block BB13 is associated with body region B11, thus a region is created including body header 1506. Because BB21 is not within the current unwind table, the number of instructions for body header 1506 is calculated as the length of instructions in basic block BB13. Additionally, the action description records for basic block BB13 are copied into the body region.

Unwind table 1442 is next traversed in substantially the same manner as described above. Processing basic blocks BB21-BB24 results in the regeneration of unwind descriptor record 1502 as shown in FIG. 15.

Unwind table 1443 is next traversed. In evaluating basic block BB14, it is determined that its original region for procedure P1 has been preceded by other regions for procedure P1. Therefore, creating prologue header 1514 in unwind descriptor record 1503 involves creating a zero length for prologue header 1514. Additionally, all of the non-'when' action description records for body region B11 are copied from the original unwind descriptor records into new unwind descriptor records.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A computer system for generating metadata for use during stack unwinding, comprising:
   a processor; and
   a memory having computer-executable instructions stored thereon, wherein the computer executable instructions include:
      a plurality of procedures, wherein each procedure comprises a sequence of binary instructions;
      a runtime for generating unwind data, wherein the unwind data includes a first plurality of blocks of metadata having a first order of blocks, wherein each block of metadata is associated with a corresponding procedure in the plurality of procedures, wherein each block of metadata in the plurality of blocks of metadata includes at least one unwind table and at least one unwind information block; and
      an unwind rewriter programmed to obtain the unwind data and reorder the first plurality of blocks of metadata to generate a second plurality of blocks of metadata having a second order, wherein the unwind rewriter reorders the first plurality of blocks in accordance with a second unwind table and a second unwind information block, wherein reordering the first plurality of blocks in accordance with a second unwind table and a second unwind information block further comprises determining when basic blocks identified in a single unwind table associated with the first order of blocks are associated with more than one unwind table associated with a current order of basic blocks, creating a new region header describing a region of zero length when the basic blocks identified in the single unwind table associated with the first order blocks are associated with more than one unwind table associated with the current order of basic blocks, and copying non-when action descriptor records from the unwind information block into the second unwind information block when the basic blocks identified in the single unwind table associated with the first order blocks are associated with more than one unwind table associated with the current order of basic blocks, wherein the first plurality of blocks are reordered in response to a modification of the sequence of binary instructions within a procedure, such that the second plurality of blocks of metadata accurately represents the same runtime semantics as that of the unmodified sequence of binary instructions.

2. The computer system of claim 1, wherein the at least one unwind information block includes a region header describing a region of zero length.

3. A computer-implemented method of regenerating unwind data for a modified binary procedure wherein a current order of basic blocks within the modified binary procedure differs from an original order of the basic blocks, the computer-implemented method comprising:
   obtaining original unwind data that describes the original order of the basic blocks, wherein the original unwind data is associated with an unwind table and unwind descriptor records, wherein the original order of basic blocks is noncontiguous and the original unwind data describes the noncontiguous order;
   regenerating new unwind data from the original unwind data, wherein regenerating new unwind data includes generating new unwind tables and new unwind descriptor records, wherein each new unwind table pertains to a different grouping of contiguous basic blocks within the noncontiguous original order of basic blocks, wherein the new unwind data includes a reordering of the original order of basic blocks, wherein regenerating the new unwind descriptor records further comprises determining when basic blocks identified in a single unwind table associated with the original order of basic blocks are associated with more than one unwind table associated with the current order of basic blocks, and creating a new region header describing a region of zero length when the basic blocks identified in the single unwind table associated with the original order of basic blocks are associated with more than one unwind table associated with the current order of basic blocks, wherein the reordering represents the same runtime semantics as that of the unmodified sequence of binary instructions, and copying non-when action descriptor records from the original unwind descriptor records into the new unwind descriptor records; and
   writing the new unwind data to the modified binary procedure.

4. The method of claim 3, wherein obtaining the unwind data comprises parsing the original unwind data that describes the original order of the basic blocks.

5. The method of claim 4, wherein parsing the original unwind data comprises identifying a start basic block and an end basic block of a region associated with the modified binary procedure.

6. The method of claim 5, wherein identifying the end basic block of the region further comprises splitting a single basic block into two basic blocks, such that a first basic block ends on a last instruction of the region.

7. The method of claim 5, wherein parsing the original unwind data further comprises identifying an unwind information block associated with a basic block in the original order of the basic blocks that includes a when action description record and establishing a link between the when action description record and the corresponding instruction in the basic block.

8. A computer-implemented method for regenerating unwind data in response to a binary modification to a procedure, the procedure including a plurality of basic blocks, comprising:
   receiving unwind data comprising an unwind table and a plurality of unwind descriptor records wherein the unwind data is associated with a procedure having binary instructions;
   modifying the procedure to perturb the binary instructions of the procedure;
   parsing the unwind data to identify a start basic block and an end basic block for a region associated with the procedure;
   rewriting the unwind data, wherein the rewriting of unwind data includes a reordering of unwind data in accordance with a second unwind table and a second plurality of unwind descriptor records such that the rewritten unwind data accurately represents the runtime semantics of the binary instructions before the binary instructions were perturbed, wherein generating the second plurality of unwind descriptor records further comprises determining when basic blocks identified in a single unwind table associated with the unmodified procedure are associated with more than one unwind table associated with the binary modified procedure; and when basic blocks identified in the unwind table are associated with more than one unwind table, creating a new region header describing a region of zero length and copying non-when action descriptor records from the unwind descriptor records into the second unwind descriptor records.

9. The computer-implemented method of claim 8, wherein parsing the unwind data further comprises generating a relationship between a when-descriptor within an unwind descriptor record and an instruction in the procedure, and rewriting the unwind data further comprises associating the when-descriptor with an appropriate unwind descriptor record in the second plurality of unwind descriptor records.

10. The method of claim 8, wherein identifying the end basic block of the region further comprises splitting a single basic block into two basic blocks, such that a first basic block ends on a last instruction of the region.

11. A computer-readable storage medium having computer-executable instructions for rewriting unwind data in response to a binary modification to a procedure, the procedure including a plurality of basic blocks, the instructions comprising:

receiving unwind data comprising an unwind table and a plurality of unwind descriptor records wherein the unwind data is associated with a procedure having binary instructions;

modifying the procedure to perturb the binary instructions of the procedure;

parsing the unwind data to identify a start basic block and an end basic block for a region associated with the procedure;

rewriting the unwind data, wherein the rewritten unwind data includes a reordering of the unwind data according to a second unwind table and a second plurality of unwind descriptor records such that the rewritten unwind data accurately represents the runtime semantics of the binary instructions before the binary instructions were perturbed, wherein reordering of the unwind data according to a second unwind table and a second plurality of unwind descriptor further comprises determining when basic blocks identified in the unwind table are associated with more than one unwind table associated with the binary modified procedure; and when basic blocks identified in the unwind table are associated with more than one unwind table, creating a new region header describing a region of zero length and copying non-when action descriptor records from the unwind descriptor records into the second unwind descriptor records.

12. A computer-readable storage medium having computer-executable instructions for rewriting unwind data wherein a current order of basic blocks within the modified binary procedure differs from an original order of the basic blocks, the instructions comprising:

obtaining original unwind data that describes the original order of the basic blocks, wherein the original unwind data is associated with an unwind table and unwind descriptor records, wherein the original order of basic blocks is noncontiguous and the original unwind data describes the noncontiguous order;

rewriting the original unwind data, wherein the rewritten unwind data includes a reordering of the original order of basic blocks, wherein rewriting the original unwind data includes:

parsing the original unwind data to identify a start block and an end block for region headers associated with the procedures in the modified binary procedures, wherein the identified start block and the identified end block are recorded in a procedure side table, recording when action description records in the procedure side table, generating new unwind tables based in the procedure side table, wherein each new unwind table pertains to a different grouping of contiguous basic blocks within the noncontiguous original order of basic blocks, generating new unwind descriptors based on the procedure side table and the new unwind table, reordering the original unwind data according to the new unwind table and the new unwind descriptors, wherein reordering includes determining when basic blocks identified in the new unwind table are associated with more than one unwind table when basic blocks identified in the new unwind table are associated with more than one unwind table, creating a new region header describing a region of zero length and copying non-when action descriptor records from the original unwind descriptor records into the new unwind descriptor records.

\* \* \* \* \*